United States Patent [19]

Beck

[11] Patent Number: 5,136,510
[45] Date of Patent: Aug. 4, 1992

[54] AIRCRAFT DECELERATION BRAKE CONTROL SYSTEM

[75] Inventor: Arnold A. Beck, Clinton, Ohio

[73] Assignee: Aircraft Braking Systems Corporation, Akron, Ohio

[21] Appl. No.: 483,200

[22] Filed: Feb. 20, 1990

[51] Int. Cl.⁵ .................................................. B60T 8/28
[52] U.S. Cl. .............................. 364/426.01; 244/111; 303/93
[58] Field of Search .................. 364/426.01, 426.02; 244/110 A, 111; 303/93, 97, 104, 105

[56] References Cited

U.S. PATENT DOCUMENTS

| | | | |
|---|---|---|---|
| 3,937,526 | 2/1976 | Ruof | 303/93 |
| 4,022,513 | 5/1977 | Hirzel et al. | 244/111 |
| 4,140,352 | 2/1979 | Delpech et al. | 303/97 |
| 4,293,165 | 10/1981 | Hirzel | 244/111 |
| 5,024,491 | 6/1991 | Pease, Jr. et al. | 303/97 |

Primary Examiner—Gary Chin
Attorney, Agent, or Firm—Renner, Kenner, Greive, Bobak, Taylor & Weber

[57] ABSTRACT

An aircraft deceleration brake control system receives deceleration command signals from left and right brake pedals of an aircraft. An amplifier generates the difference between the two command signals while an inertial navigation system of the aircraft provides a signal corresponding to the instantaneous deceleration of the aircraft. First and second control signals, corresponding to the respective command signals, are generated as a function of the difference in value between the command signals and the amplitude of the instantaneous deceleration signal.

10 Claims, 1 Drawing Sheet

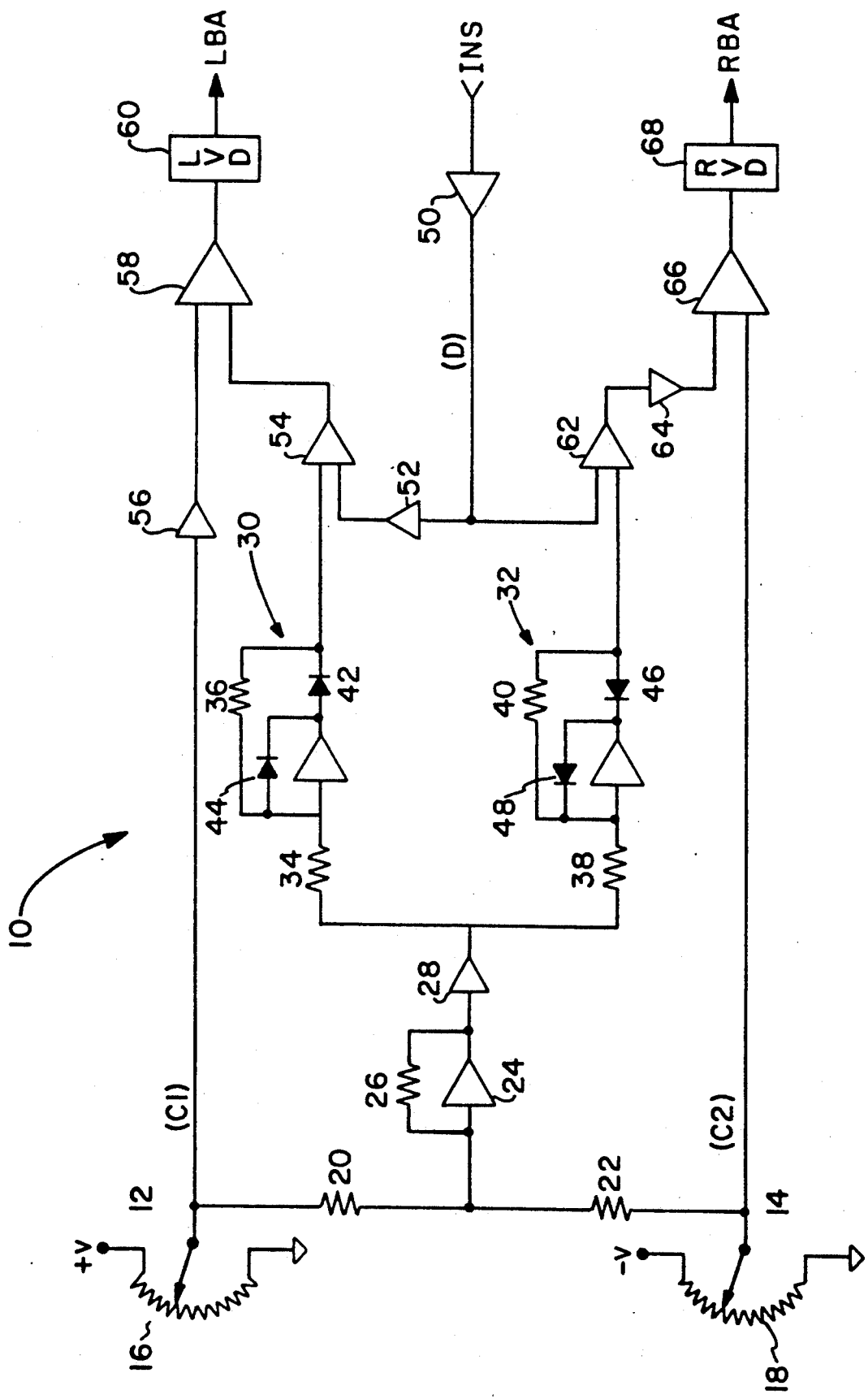

AIRCRAFT DECELERATION BRAKE CONTROL SYSTEM

TECHNICAL FIELD

The invention herein resides in the art of vehicle braking systems and, more particularly, to braking systems for aircraft. Specifically, the invention relates to an aircraft braking system employing deceleration feedback control.

BACKGROUND ART

In many aircraft braking systems, a pilot typically adjusts the braking effort with a pair of brake pedals, the degree of brake pedal depression demanding a related brake pressure. The resulting brake torque and deceleration of the aircraft vary, however, as a function of the physical characteristics of the associated brake assemblies.

In many aircraft, it is desirable that the braking system be deceleration based such that pedal depression correlates with a specific demand for deceleration. By way of example, half pedal depression could correlate with a deceleration rate of 10 ft/sec$^2$, while quarter pedal depression would correlate with a deceleration rate of 5 ft/sec$^2$. In such systems, the deceleration rate of the aircraft is substantially independent of the relationship between brake pressure and brake torque.

Automatic braking systems are known in the aircraft industry. While the same typically constitute a deceleration based system, they typically operate independent of the pilot. Once the pilot selects a desired deceleration rate, braking control is removed from the pilot and is totally controlled through automatic system operation. Such is most undesirable in many braking situations, particularly where it is necessary for the pilot to retain steering capabilities. Since ground steering of an aircraft is typically controlled by braking operations, known automatic braking systems are ineffective to allow the pilot to maintain the requisite control.

A unique problem arises in braking systems where it is desired to maintain left and right brake control through left and right pedals, while attaining deceleration-based brake control. Specifically, a single deceleration (acceleration) signal is associated with the aircraft as a whole, while separate left and right brake control signals are produced from left and right brake pedals. Unless special measures are taken, the resultant control would be left-right unstable. In other words, the larger command signal, from either the left or right brake pedal, would shut off the smaller command signal. Only when both command signals are equal would the braking be symmetrical. This results in the system having two sources of control input signals (brake pedals) and a single feedback signal correlated to vehicle deceleration.

It is most desirable to provide a pilot-controlled deceleration-based braking system for aircraft, allowing the pilot to brake the aircraft at pedal-selected deceleration rates, while maintaining left-right braking and steering control.

DISCLOSURE OF INVENTION

In light of the foregoing, it is a first aspect of the invention to provide an aircraft deceleration brake control system which allows for pilot control throughout the entire braking effort.

Another aspect of the invention is to provide an aircraft deceleration brake control system which allows for continuous left-right or symmetrical braking.

Still a further aspect of the invention is the provision of an aircraft deceleration brake control system which allows for two separate control pedals to command deceleration in a system having a single deceleration feedback signal.

Still another aspect of the invention is the provision of an aircraft deceleration brake control system in which braking effort is deceleration dependent and substantially independent of brake torque characteristics and the like.

An additional aspect of the invention is the provision of an aircraft deceleration brake control system which is readily conductive to implementation with state of the art aircraft.

The foregoing and other aspects of the invention which will become apparent as the detailed description proceeds are achieved by an aircraft deceleration brake control system, comprising: first and second brake pedals respectively presenting first and second command signals; first means for receiving said first and second command signals and generating a difference signal corresponding to a difference between said first and second command signals; second means for generating a feedback signal corresponding to instantaneous deceleration of the aircraft; and third means for receiving said first and second command signals, said difference signal, and said feedback signal and generating therefrom first and second control signals, said first control signal being applied to a first brake valve driver and said second control signal being applied to a second brake valve driver.

DESCRIPTION OF DRAWING

For a complete understanding of the objects, techniques and structure of the invention reference should be made to the following detailed description and accompanying drawing wherein a schematic diagram of the aircraft deceleration brake control system of the invention is shown.

BEST MODE FOR CARRYING OUT THE INVENTION

Referring now to the drawing, it can be seen that an aircraft deceleration brake control system is designated generally by the numeral 10. As shown, a dual pedal system is interconnected with a left brake assembly (LBA), a right brake assembly (RBA), and the inertial navigation system (INS) of the aircraft. The left and right brake assemblies, in standard fashion, comprise a brake disc stack, associated valve, and pressure plate. The inertial navigation system obtains and provides data respecting the operation of the aircraft and, for purposes herein, provides an output signal corresponding to the instantaneous deceleration rate of the aircraft.

As further shown in the drawing, the brake control system 10 employs a left brake pedal 12 and right brake pedal 14, the same being interconnected as potentiometers through resistors 16, 18 to respective positive and negative voltage sources interconnected with ground. It will be appreciated by those skilled in the art that a left command signal C1 and a right command signal C2 are presented with voltage levels corresponding to the position of the associated brake pedal. Particularly, the command signal C1 will typically be a positive voltage signal corresponding to brake pedal position and demanded deceleration rate, while the command signal C2 associated with the brake pedal 14 will constitute a negative voltage signal corresponding to the position of the brake pedal 14 and the deceleration rate demanded thereby. Of course, it will be readily appreciated by those skilled in the art that the potentiometers of resistors 16, 18 associated with the brake pedals 12, 14 may each be substituted with a linear variable differential transformer (LVDT) as is presently known in the art.

The positive command signal C1 from the pedal 12 passes through input resistor 20 to the inverting amplifier 24, while the negative command signal C2 from the pedal 14 passes through the input resistor 22 to such amplifier. A feedback resistor 26 is provided in associated with the inverting amplifier 24 to provide a desired gain corresponding to the feedback loop gain of the control system under consideration. In a preferred embodiment of the invention, the gain is 0.8 such that the output of the amplifier 24 is 0.8 (C2−C1) and the output of the inverter 28 is −0.8 (C2−C1).

The output of the inverter 28, a scaled difference between the command signals C1 and C2, is then provided to a pair of parallel inverting amplifier circuits 30, 32. As shown, the circuit 30 has an input resistor 34 and feedback resistor 35 similar to the input resistor 38 and feedback resistor 40 of the circuit 32. The respective input and feedback resistors are scaled for unity gain. Of particular importance in the inverting amplifier circuits 30, 32 are the output and feedback diodes shown. Specifically, the circuit 30 includes an output diode 42 and a feedback diode 44 biased oppositely from the output diode 46 and feedback diode 48 of the circuit 32. As will be appreciated by those skilled in the art, the diode arrangements just discussed assure that the output of the circuit 30 is equivalent to 0.8 (C2−C1) when C2 is greater than C1 and otherwise the output therfrom is zero. In like manner, the output of circuit 32 is 0.8 (C2−C1) when C1 is greater than C2, and otherwise is at a zero level. It should therefore be appreciated that output signals are provided mutually exclusively from the amplifier circuits 30, 32 dependent upon the relative amplitudes of the absolute values of the command signals C1 and C2.

Received from the aircraft inertial navigation system is a signal D which corresponds to the instantaneous aircraft deceleration. This signal is passed through an amplifier 50 of the brake control system 10. The deceleration signal D is then passed through an inverter 52 and to the inverting summing amplifier 54. The brake pedal command signal C1 is inverted by means of the inverter 56 with the outputs of the inverter 56 and inverting summing amplifier 54 being provided to the inverting summing amplifier 58. It will be appreciated that the amplifier 58 comprises a summing point for the command signal C1 and a modified feedback signal for generation of an error signal to be applied to the left valve driver to control the left brake assembly. The output of the amplifier 58 is C1−[d−0.8(C2−C1)] where C2 is greater than C1, and the output is C1−D when C1 is greater than or equal to C2.

As shown in the drawing, the output of the amplifier circuit 32 is passed to an inverting summing amplifier 62 along with the deceleration signal D. The output of the amplifier 62 is inverted by the inverter 64 with that output then being combined at the inverting summing amplifier 66 with the command signal C2. Again, the amplifier 66 serves as a summing point too receive the command signal C2 and a modified feedback signal, generating therefrom an appropriate error or control signal for application to the right valve drive 68 to control the right brake assembly. It will again be readily appreciated by those skilled in the art that the output of the amplifier 66 will be C2−[d+0.8(C2−C1)] when C1 is greater than C2 and will equal C2−D when C2 is greater than or equal to C1.

It will be readily appreciated by those skilled in the art that when the command signals C1 and C2 are equal, the amplifiers 30, 32 provide no output and the amplifiers, 58, 66 provide an error signal by simply subtracting the deceleration signal D from the appropriate command signals C1, C2.

It should be appreciated that the concept of the invention allows for a deceleration based braking system which remains under pilot control. Left and right control signals, C1 and C2 respectively, are continuously compared and a percentage (less than unity) of the difference between the two is generated as a feedback modifier. The greater of the two control signals C1 and C2 is combined in standard fashion with a feedback deceleration signal, while the smaller of the two is combined with the feedback modifier. Accordingly, the smaller control signal remains effective in the braking operation and continuous left-right or symmetrical braking can be achieved. Further, in a deceleration based braking system employing a single feedback signal corresponding to the aircraft deceleration, the braking effort remains continuously under pilot control without instability otherwise characteristic of systems employing a single feedback signal to be combined with substantially independent input signals. It will be appreciated that the multiplier (less than unity) used for obtaining the feedback modifier will be established as a function of the feedback loop gain of the control system as will be readily perceived by those skilled in the art. While a multiplier will typically be on the order of 0.6–0.95, the same will typically be tailored to the specific braking system to assure the desired system stability. In the embodiment discussed above, the multiplier was set at 0.8.

This it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. An aircraft deceleration brake control system, comprising:
   first and second brake pedals respectively presenting first and second command signals;
   first means for receiving said first and second command signals and generating a difference signal corresponding to a difference between said first and second command signals;
   second means for generating a feedback signal corresponding to instantaneous deceleration of the aircraft;
   third means for receiving said first and second command signals, said difference signal, and said feedback signal and generating therefrom first and second control signals, said first control signal being applied to a first brake valve driver, and said second control signal being applied to a second brake valve driver; and wherein said first control signal equals said first command signal minus said feedback signal when said first command signal is greater than or equal to said second command signal.

2. The aircraft deceleration brake control system according to claim 1 wherein said second control signal equals said second command signal minus said difference signal when said first command signal is greater than said second command signal.

3. The aircraft deceleration brake control system according to claim 1, wherein said second control signal equals said second command signal minus said feedback signal when said second command signal is greater than or equal to said first command signal.

4. The aircraft deceleration brake control system according to claim 3, wherein said first control signal equals said first command signal minus said difference signal when said second command signal is greater than said first command signal.

5. The aircraft deceleration brake control system according to claim 1, wherein said third means comprises a pair of parallel amplifiers, oppositely biased such that a first of said amplifiers passes said difference signal only when said second command signal is greater than said first command signal, and a second of said amplifiers passes said difference signal only when said first command signal is greater than said second command signal.

6. The aircraft deceleration brake control system according to claim 5, wherein said first means comprises an amplifier generating said difference signal with a gain of less than unity.

7. An aircraft deceleration brake control system, comprising:

first and second brake pedals respectively presenting first and second command signals:

first means for receiving said first and second command signals and generating a difference signal corresponding to a difference between said first and second command signals;

second means for generating a feedback signal corresponding to instantaneous deceleration of the aircraft;

third means for receiving said first and second command signals, said difference signal, and said feedback signal and generating therefrom first and second control signals, said first control signal being applied to a first brake valve driver, and said second control signal being applied to a second brake valve driver; and wherein said second control signal equals said second command signal minus said feedback signal when said second command signal is greater than or equal to said first command signal.

8. The aircraft deceleration brake control system according to claim 7, wherein said first control signal equals said first command signal minus said difference signal when said second command signal is greater than said first command signal.

9. An aircraft deceleration brake control system, comprising:

first and second brake pedals respectively presenting first and second command signals:

first means for receiving said first and second command signals and generating a difference signal corresponding to a difference between said first and second command signals;

second means for generating a feedback signal corresponding to instantaneous deceleration of the aircraft; and third means for receiving said first and second command signals, said difference signal, and said feedback signal and generating therefrom first and second control signals, said first control signal being applied to a first brake valve driver, and said second control signal being applied to a second brake valve driver, said third means comprising a pair of parallel amplifiers, oppositely biased such that a first of said amplifiers passes said difference signal when said second command signal is greater than said first command signal, and a second of said amplifiers passes said difference signal only when said first command signal is greater than said second command signal.

10. The aircraft deceleration brake control system according to claim 9, wherein said first means comprises an amplifier generating said difference signal with a gain of less than unity.

* * * * *